E. SCHNEIDER.
MOTOR CAR HAVING FOUR DRIVING WHEELS FOR THE TRANSPORT OF GUNS.
APPLICATION FILED OCT. 29, 1920.

1,396,598.

Patented Nov. 8, 1921.
9 SHEETS—SHEET 2.

E. SCHNEIDER.
MOTOR CAR HAVING FOUR DRIVING WHEELS FOR THE TRANSPORT OF GUNS.
APPLICATION FILED OCT. 29, 1920.

1,396,598.

Patented Nov. 8, 1921.

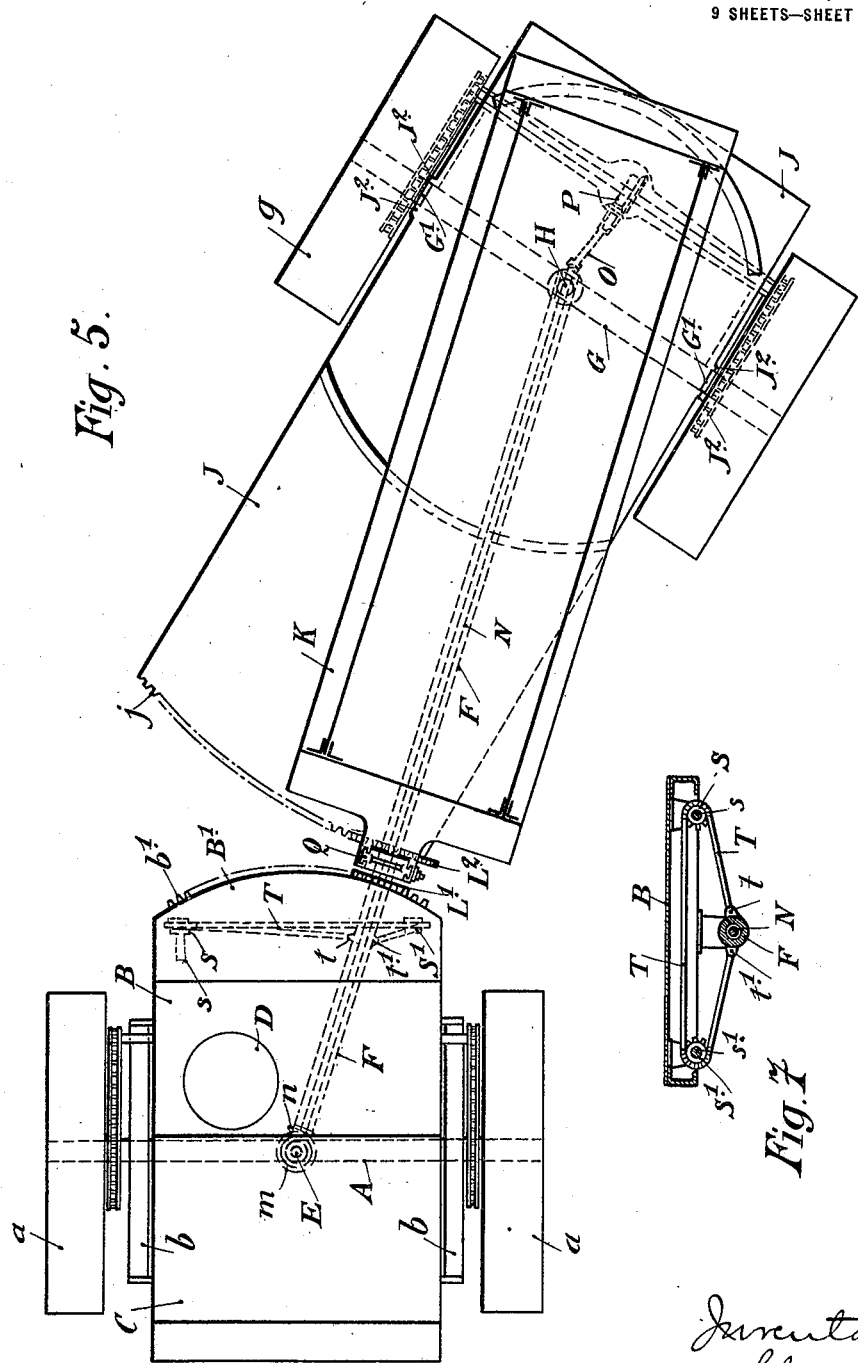

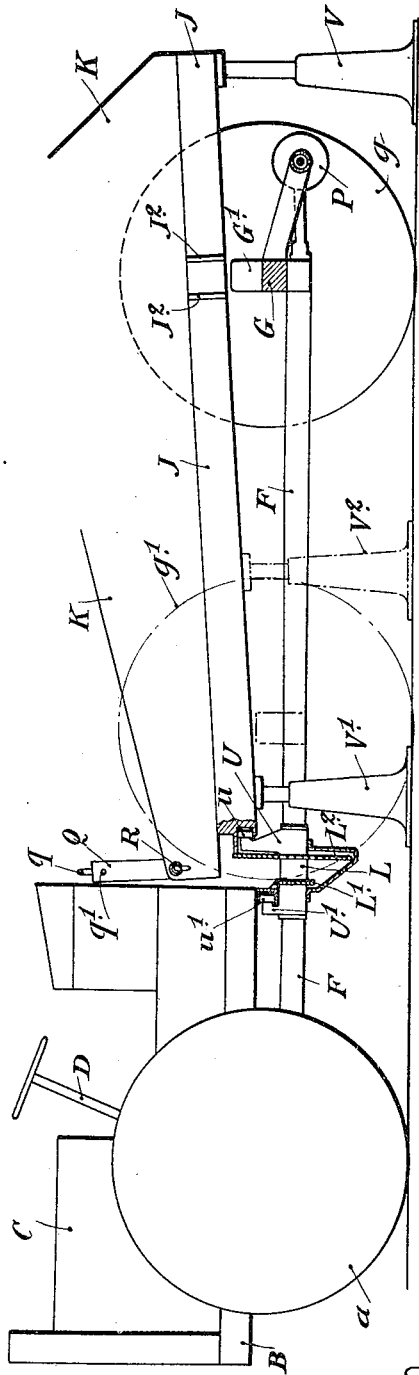

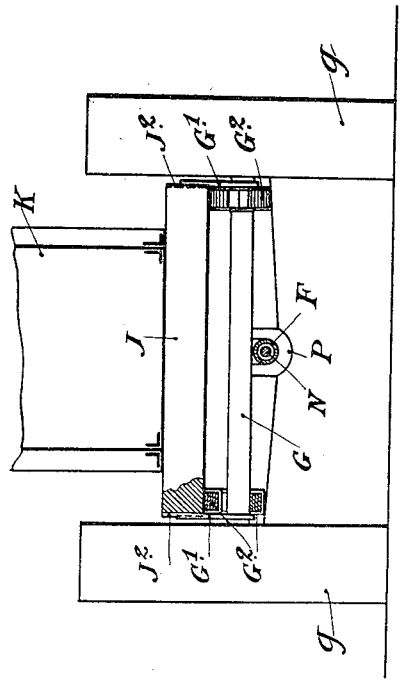
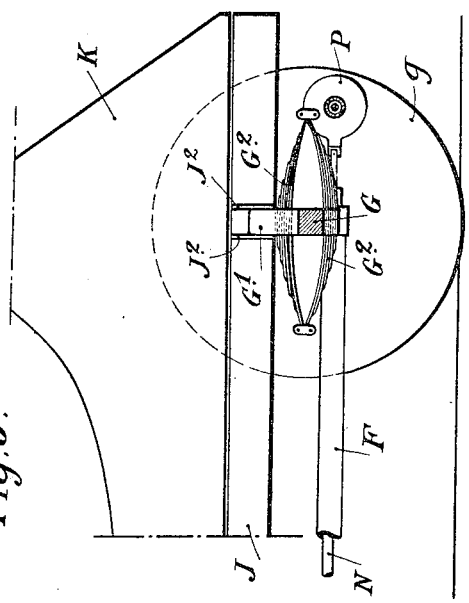

E. SCHNEIDER.
MOTOR CAR HAVING FOUR DRIVING WHEELS FOR THE TRANSPORT OF GUNS.
APPLICATION FILED OCT. 29, 1920.
1,396,598.
Patented Nov. 8, 1921.
9 SHEETS—SHEET 7.
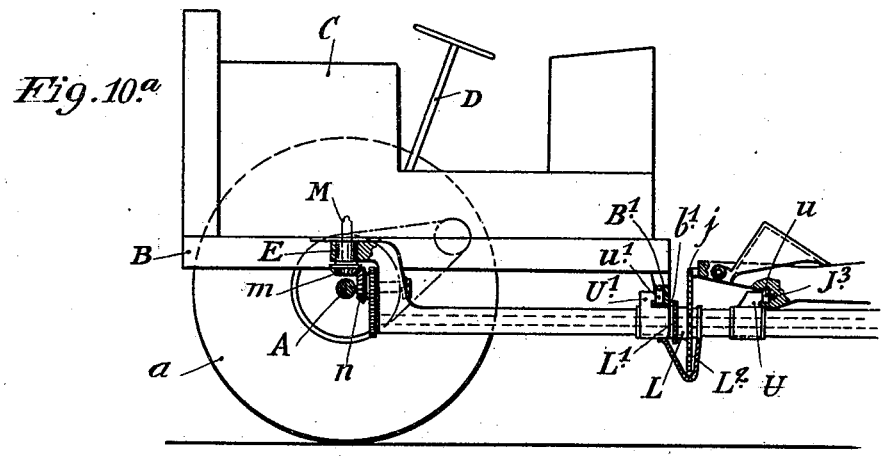
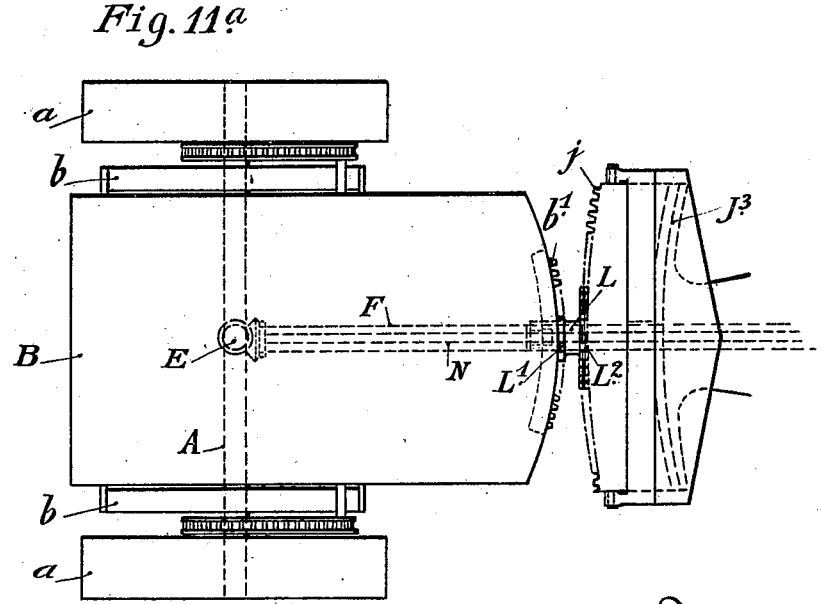

E. SCHNEIDER.
MOTOR CAR HAVING FOUR DRIVING WHEELS FOR THE TRANSPORT OF GUNS.
APPLICATION FILED OCT. 29, 1920.
1,396,598.
Patented Nov. 8, 1921.
9 SHEETS—SHEET 8.
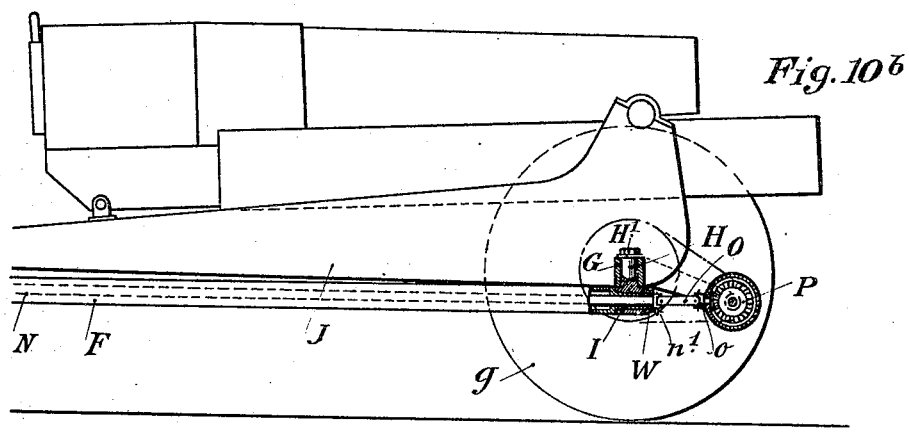
Fig. 10<sup>b</sup>
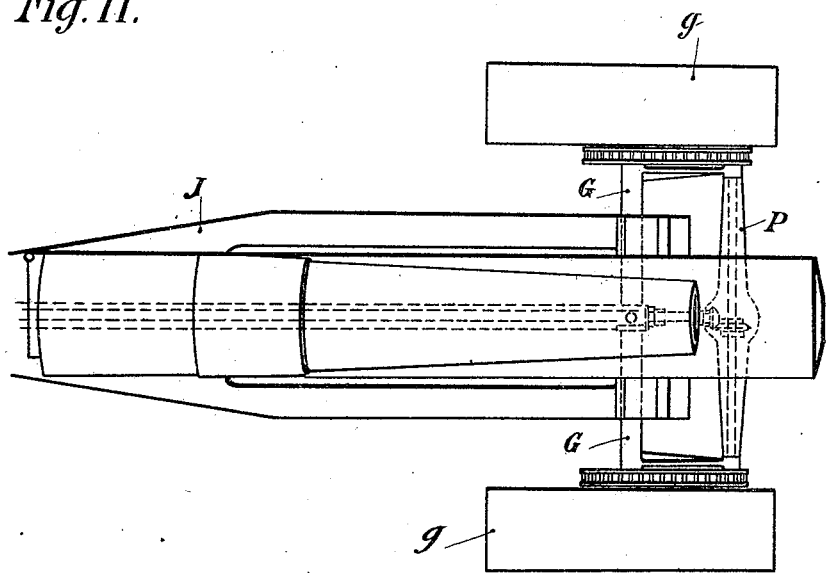
Fig. 11<sup>b</sup>

E. SCHNEIDER.
MOTOR CAR HAVING FOUR DRIVING WHEELS FOR THE TRANSPORT OF GUNS.
APPLICATION FILED OCT. 29, 1920.
1,396,598.
Patented Nov. 8, 1921.
9 SHEETS—SHEET 9.
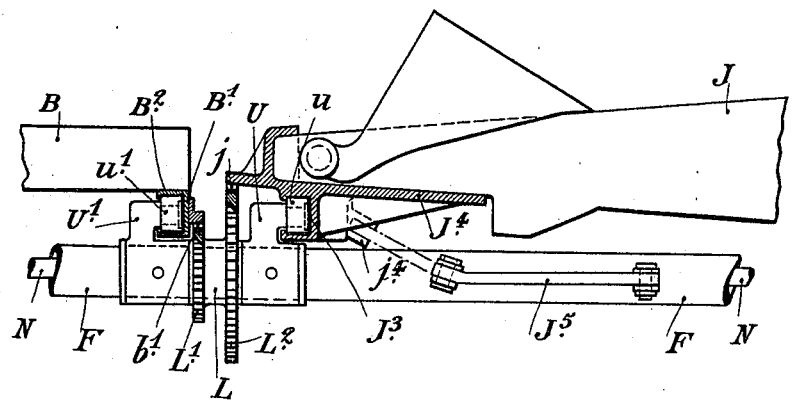
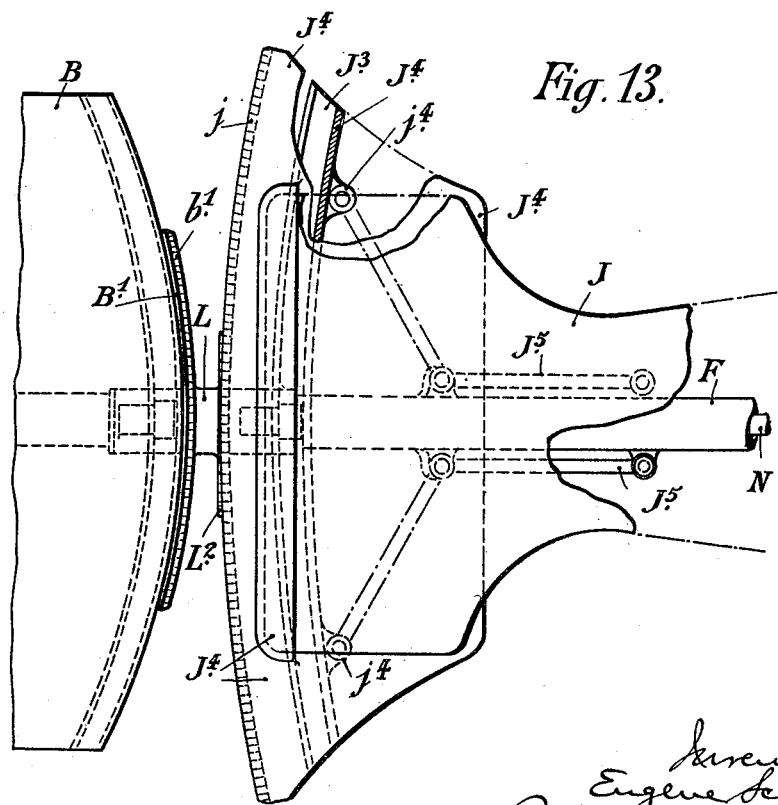

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

MOTOR-CAR HAVING FOUR DRIVING-WHEELS FOR THE TRANSPORT OF GUNS.

1,396,598.  Specification of Letters Patent.  Patented Nov. 8, 1921.

Application filed October 29, 1920. Serial No. 420,527.

*To all whom it may concern:*

Be it known that I, EUGÈNE SCHNEIDER, citizen of the Republic of France, resident of 42 Rue d'Anjou, Paris, France, have invented new and useful Improvements in Motor-Cars Having Four Driving-Wheels for the Transport of Guns, which invention is fully set forth in the following specification.

This invention has for its object to provide an improved motor-car having four driving wheels, of the type described in French Patent No. 493636 of 5 December 1918.

This improved car comprises, like the one described in the aforesaid patent, two trucks connected together in such a manner as to be capable at all times of being deflected simultaneously through the same angle and to the same side relatively to the axial line joining the centers of their road axles, while the same trucks are capable at all times of executing a transverse rocking motion in any direction and through any angle relatively to the same axial line.

The chassis of these trucks carry each, for this purpose, a vertical pivot pin around which the respective road axle is adapted to turn. These said chassis are provided on their inner side with a toothed sector receiving its motion from a toothed member carried by a connecting bar connecting the centers of their road axles.

The improved car is more particularly designed for the transport of guns, the chassis of the front truck carrying the engine, whereas the transported load is carried on the chassis of the hind truck. The chief improvements made in the car for this purpose consist of a particular construction of the chassis of the hind truck for utilizing a portion of the parts of the gun, both as regards the constitution of the vertical pivot pin of the hind road axle and that of the toothed sector driven from the connecting bar between the road axles of the two trucks. A further improvement consists in a peculiar construction of the said connecting bar for mounting the gear transmitting the motion of the engine to the hind wheels.

The member for driving the toothed sectors of the chassis on the connecting bar is constructed in a peculiar manner so as to allow of the use of a hind truck of suitable length for carrying the load, while permitting at all times of each truck being turned through an equal angle and in the reverse direction.

Various constructional examples of this invention are illustrated in the accompanying drawings in which:—

Figures 1 to 7 illustrate an improved car of the type specified, designed for the transport of a heavy gun comprising, in addition to the gun carriage proper, a platform intended to be installed on the ground and upon which the said gun carriage is capable of turning around a vertical axis for training the gun.

Fig. 1 is a side elevation of the improved car carrying the load, the two trucks being shown resting on flat ground, in the position they occupy in traveling in a straight line.

Fig. 2 is a corresponding plan in partial section on the line 2—2 of Fig. 1.

Figure 1:
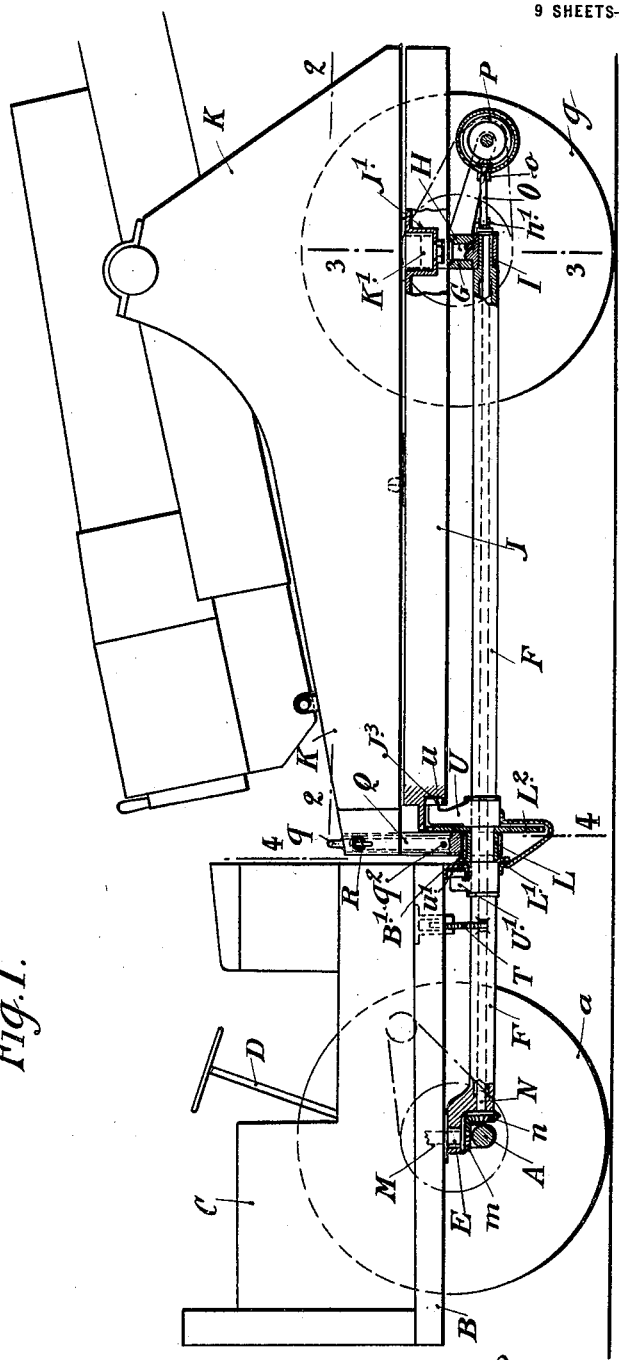
Figure 3:
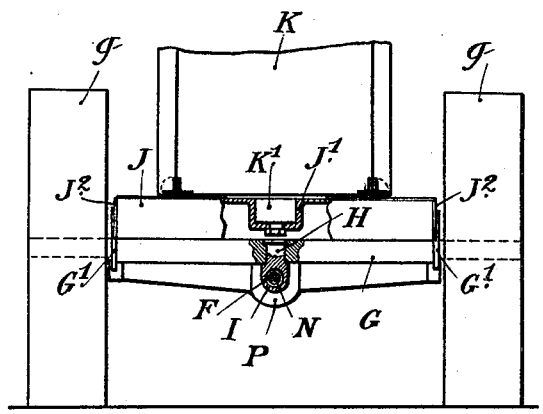
Figure 4:
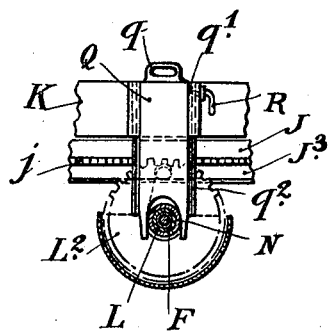

Figs. 3 and 4 are partial sectional elevations taken respectively on the lines 3—3 and 4—4 of Fig. 1.

Figure 2:
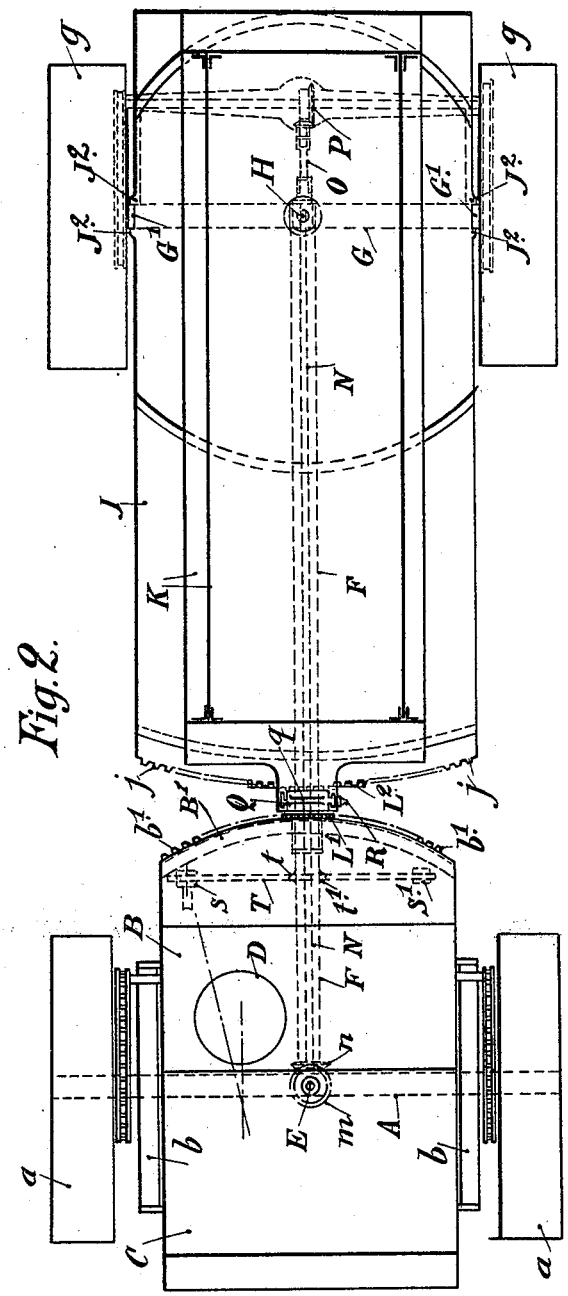

Fig. 5 is a plan similar to Fig. 2, showing the improved car and its load in the positions they occupy when traveling around a curve on flat ground.

Fig. 6 is a partial elevation showing the unloading of the load, one of the elements of which, namely, the gun carriage platform, constitutes the chassis of the hind truck.

Fig. 7 is a sectional elevation illustrating the mechanism for controlling the turning movements.

Fig. 8 is a partial longitudinal view in elevation of the hind carriage.

Fig. 9 is a partial cross sectional view through the rear axle of the hind carriage.

Figs. $10^a$, $10^b$, and $11^a$, $11^b$, illustrate respectively in elevation and in plan, a second example embodying the principle of this invention.

Fig. 12 is a view in partial elevation and Fig. 13 is a plan view of the same illustrating a further modification.

The improved car comprises a fore-carriage constructed like the one of the car described in the aforesaid French Patent No. 493636. A is the road axle of this fore-carriage; $a$ and $a$ are the wheels. From this axle there is suspended by means of springs $b$ a chassis B that carries the engine C and the steering mechanism D. E is a vertical pivot pin projecting from the underside of the chassis B. The chassis B is provided at its rear end with an arc $B^1$ provided with teeth $b^1$ having its center in the middle of the road axle A. These teeth, as will be seen hereinafter, are in constant mesh with the special driving member mounted on the bar F that connects the road axle of the fore-carriage to the road axle of the hind carriage.

The hind carriage comprises a road axle G fitted with the wheels $g$. In the middle of this road axle there is engaged a vertical pivot pin H carrying at its lower end a horizontal sleeve I that serves as a bearing for the rear end of the connecting bar F.

The chassis J of the hind truck is constituted by the platform of the gun to be transported. This platform comprises a footstep bearing $J^1$ which, in the position of transport, will have its axis in a line with the geometrical axis of the pivot pin H. The gun carriage proper K is mounted on the platform J and is provided on its under side with a projecting pivot pin $K^1$ engaging in the footstep bearing $J^1$.

At its front end the platform J carries a toothed sector $j$ having its center on the geometrical axis of the pivot pins $K^1$ and H, said axis passing through the center of the hind road axle. The special driving member mounted on the connecting bar F, which allows the two front and hind trucks B and J to turn through the same angle and to the same side of the axis of said bar, is constituted by a sleeve L loose on the said bar F and carrying at its ends two pinions $L^1$ and $L^2$ of different diameters, the ratio between the numbers of the teeth of these pinions being equal to the ratio between the radii of the toothed sectors $b^1$ and $j$.

The motion of the engine mounted on the chassis B of the fore-truck is transmitted to the road wheels $a$ in the usual manner through the medium of a differential. The gear for transmitting the motion of the engine to the hind road wheels is effected through the medium of a vertical shaft M carrying a bevel toothed wheel $m$, the said shaft being coaxial with the pivot pin E. The pinion $m$ meshes with a bevel pinion $n$ fixed on the end of a shaft N revolving inside the hollow connecting bar F.

The rear end of the shaft N is connected by a Cardan joint $n^1$ to an intermediate shaft O which is connected in its turn by a Cardan joint $o$ to the differential P, whereby the motion is transmitted in the usual manner to the road wheels $g$ of the hind carriage.

It will be perceived that the transverse rocking of the hind road axle relatively to the connecting bar F, is effected by the sleeve I rotating on the rear extension of the said bar, whereas the front road axle is able to turn transversely with the bar F.

In order that in the turning movements the center of gravity of the whole of the hind carriage and the load carried by it shall be prevented from being displaced too much relatively to the connecting bar F, there is provided on the gun carriage K a removable retaining device, which while allowing of the gun carriage turning transversely in relation to the bar, shall yet prevent any lateral deviation relatively to the axis of the said bar.

In the example shown, this retaining device consists of a removable sliding member Q engaged in a recess provided in the rear portion of the gun carriage K, and which has a lower end in the form of a fork embracing the bar F. This sliding member is provided at its upper end with a handle $q$, and it can be locked in its operative and inoperative positions by means of a bolt R carried by the gun carriage and adapted to engage at will into one or other of the two notches $q^1$, $q^2$ formed in the said sliding member Q.

The simultaneous turning of the two trucks may be effected in the usual manner, as shown in Fig. 7 in sectional elevation and in Figs. 2 and 5 in plan.

The turning movements are produced by means of the steering device D terminating in a pinion S carried by a shaft $s$ journaled in a bracket fixed to the chassis B. A chain T attached at its ends $t$, $t^1$ to the connecting bar F, is adapted to be wound on the pinion S and on a second pinion $S^1$ fixed on a shaft $s^1$ journaled in another bracket carried by the chassis B.

The pull of the pinion S upon the chain T attached to the bar F, which latter is prevented from turning, produces a turning movement of the fore-carriage, and through the medium of the teeth $b^1$ and of the driving gear $L^1$—L—$L^2$, it produces also the turning movement of the teeth $j$ and consequently a turning movement of the hind carriage.

The gun carriage K and the platform J must be capable of being placed as a whole easily upon the car constituted by the fore-carriage carrying the engine, the connecting bar F with its driving gear $L^1$—L—$L^2$, and the hind carriage $g$—G—$g$, and must likewise be able to be removed by a simple operation. For this purpose the chassis-platform J is provided on each of its longitudinal sides with guide ribs $J^2$ between which there are engaged, at the time of placing the load in position, plates $G^1$ carried by the road axle G. A guide track $J^3$ concentric to the toothed sector $j$, is formed on the platform J. By means of the channel thus formed, the chassis J bears upon a roller $u$ carried by an arm U fixed to the bar F. Another bar $U^1$, likewise fixed to the said bar, carries a roller $u^1$ which is engaged in an arc-shaped guide track $B^2$ fixed to the underside of the chassis B of the fore-carriage.

In order to effect the removal of the load, it is sufficient, as shown in Fig. 6, to place jacks V and V¹ under the platform J, and to raise the said platform by means of said jacks. Then the vehicle constituted by the fore-carriage and the bar F, is moved away from the hind carriage, until the road wheels $g$ of this hind carriage have come into the position indicated in dot and dash lines at $g^1$. The jacks V¹ can then be shifted into the position indicated in dot and dash lines at V² to the rear of the road axle of the hind carriage, whereupon the vehicle can be completely removed.

As shown in partial longitudinal elevation and in partial cross section through the road axle of the hind carriage in Figs. 8 and 9, the load, instead of resting directly upon the road axle of the hind carriage, may rest upon suspension springs G².

In the constructional form shown in Figs. 10ª, 10ᵇ and 11ª, 11ᵇ the hind carriage is constituted by the axle and wheels of a trail gun carriage. In this case the gun carriage trail J is arranged, in the same manner as was the platform J in the preceding example, to take a bearing by means of an arc track J³ formed on the trail tail plate, upon a roller $u$ carried by an arm U fixed to the connecting bar F. The trail tail plate has also teeth $j$ meshing with the pinion L² of the special driving member L¹—L—L².

The transmission of the motion of the engine to the wheels $g$ of the gun carriage is effected exactly in the same manner as, in the preceding example, the transmission of motion to the wheels of the hind carriage was effected, by means of a shaft N journaled in the tubular connecting bar F. In this example, as in the preceding example, the teeth $b^1$ and $j$, instead of being formed as spur teeth on the sectors, may of course be formed as crown teeth projecting from the underside of the corresponding sectors in such a manner as to engage vertically between the teeth of the pinions L¹ and L² instead of engaging horizontally therewith.

In the example shown in Figs. 10 and 11, when it is desired to separate the combination of the fore-carriage carrying the engine and the connecting bar F from the gun, it is sufficient to provide a support for the trail J, by means of a jack, then to remove the pin of the Cardan joint $n^1$ and unscrew a stop nut W placed on the end of the shaft N. It is then possible to remove the fore-carriage and the bar F which carries with it the shaft N. The pivot pin H, together with the sleeve I carried by it, remain in position upon the road axle G, being kept back by the nut H¹.

In the modification shown in Figs. 12 and 13 the teeth $j$ and the arc track J³ are formed on a part J⁴ which is independent of the trail J, and into which the trail tail plate can be fitted for transport. This independent part J⁴ may, when the gun is separated from the fore-carriage and the bar F, be held upon the latter by means of two links J⁵. These links occupy during transport, the position shown in full lines in which they are pinned upon the bar F.

For the purpose of fixing the part J⁴ upon the bar when the gun has been removed, the said links are brought into the position indicated in dotted lines, by pinning them to lugs $j^4$ formed on the said part.

Having now particularly described and ascertained the nature of my said invention and in what manner the same is to be performed, I declare that what I claim is:—

1. In a motor driven car for transporting guns, the combination of a motor driven forward wheeled truck and a rear gun carrying wheeled truck, each truck being provided with a chassis having a toothed sector, the center of each sector being in a line perpendicular to its respective truck axle at the center of the latter, a tubular draw-bar connecting said chassis and having flexible connections with each chassis, a drive shaft housed in said connection and having drive connections with the motor and driving connections with said rear truck wheels, and gear connections between said sectors carried by said draw-bar connection for transmitting steering movements of the front truck to the rear truck.

2. In a motor driven car of the character defined in claim 1 wherein the rear toothed sector has a radius longer than that of the forward sector and said gear connections comprise a sleeve having pinions the diameter of which are proportioned to the radii respectively of said two sectors.

3. In a motor driven car for transporting guns, the combination of a motor driven forward wheeled truck and a rear gun carrying wheeled truck, each truck being provided with a chassis, a tubular draw-bar having pivotal connection with each chassis, steering means and gear operated sectors controlled by said steering means for imparting turning movement to said rear truck and means for transmitting power from said motor to said rear truck wheels comprising a vertical motor driven shaft coaxial with the forward pivot connection, a second shaft housed in said draw-bar connection and having gear connection with said motor driven shaft and Cardan driving connections between said second shaft and the rear truck wheels.

4. In a motor driven car for transporting guns, the combination of a motor driven forward wheeled truck and a rear wheeled truck, a draw-bar having pivotal connection with both trucks, driving connections between said motor and the wheels of the rear truck, means for simultaneously angularly deviating both trucks relatively to said draw-bar, a chassis on the rear truck comprising a gun platform having a foot-step bearing the axis of which is in a vertical line with the axis of the rear pivotal connection of said draw-bar; a gun carriage having a pivot resting in said bearing and a removable locking member for fastening the rear end of said gun carriage to said draw-bar for preventing lateral deviation of the carriage in respect to said draw-bar when the gun platform is given a lateral deviation in respect to said bar.

5. In a motor driven car of the character defined in claim 4 wherein said gun platform is provided with side guide ribs to receive lugs on the rear truck axle and with a rear channel guide track to receive a supporting arm fast to said draw-bar connection whereby said platform may be detachably retained on said truck.

6. In a motor driven car for transporting guns, the combination of a motor driven forward wheeled truck and a rear wheeled truck, a hollow draw-bar having flexible connections with the truck axles, the rear connection comprising a sleeve revolubly mounted on said draw-bar and having a transverse pivot adapted to enter a recess in the rear axle thereby permitting steering and rocking of said rear truck on uneven ground, a driving shaft housed in said draw-bar and having connections with said motor and rear wheels and means for simultaneously angularly deviating both trucks in respect to said draw-bar.

In testimony whereof I have signed this specification.

EUGÈNE SCHNEIDER.

Witnesses:
 ANDRÉ MOSTICKER,
 LOUIS GARDET.